United States Patent [19]

Magee, Jr. et al.

[11] 3,912,619
[45] Oct. 14, 1975

[54] PREPARATION OF CRACKING CATALYST

[75] Inventors: John Storey Magee, Jr., Cooksville;
Raymond Preston Daugherty, Jr.,
Simpsonville, both of Md.

[73] Assignee: W. R. Grace & Co., New York, N.Y.

[22] Filed: May 2, 1974

[21] Appl. No.: 466,441

Related U.S. Application Data

[63] Continuation-in-part of Ser. No. 282,369, Aug. 21, 1972, abandoned.

[52] U.S. Cl............ 208/120; 252/455 R; 252/455 Z
[51] Int. Cl.².................... B01J 29/12; C10G 11/04
[58] Field of Search.................................... 208/120

[56] References Cited
UNITED STATES PATENTS 3,210,294  10/1965  Chomitz et al. ............... 252/453
3,433,748  3/1969   Magee et al. .................. 252/453

Primary Examiner—Delbert E. Gantz
Assistant Examiner—G. E. Schmitkons
Attorney, Agent, or Firm—Joseph P. Nigon

[57] ABSTRACT

A process for preparing a low surface area attrition resistant silica-alumina hydrogel catalyst wherein sodium silicate is gelled with alum under specifically controlled conditions. The hydrogel composition possesses a pore size distribution wherein the majority of the pores have a diameter of about 45 to 125 A units. The hydrogel catalyst may be advantageously combined with stabilized zeolites to prepare highly active catalysts for the catalytic conversion of hydrocarbons.

5 Claims, No Drawings

PREPARATION OF CRACKING CATALYST

RELATED APPLICATION

This is a continuation-in-part of U.S. Pat. application Ser. No. 282,369, filed Aug. 21, 1972 and now abandoned.

BACKGROUND OF THE INVENTION

The present invention relates to the preparation of hydrocarbon conversion catalyst, and more specifically to the preparation of an amorphous silica-alumina hydrogel which possesses a unique low surface area and large pore characteristic which renders it particularly suitable for use as a hydrocarbon cracking catalyst or a catalyst component in combination with zeolites and/or clay.

It has long been known that amorphous silica-alumina hydrogels may be utilized as catalysts for the catalytic cracking of hydrocarbons. More recently it has been found that silica alumina hydrogels may be advantageously combined with additional catalyst components such as clay and crystalline alumino silicates (zeolites) to yield more active and stable cracking catalysts.

In the cracking of hydrocarbons on a commercial scale, considerable difficulty is encountered with the cyclic regneration of catalysts to remove coke deposits. Typical prior art catalysts which comprise or contain silica-alumina hydrogel frequently possess high surface areas and small pore ccharacteristics which cause considerable adsorption of hydrocarbons. Removal of these hydrocarbons prior to regeneration is difficult. Accordingly, it is frequently found that many previously developed silica-alumina catalysts undergo considerable thermal and/or physical degradation which occurs when excessive amounts of hydrocarbons are burned off at high temperatures in a commercial regeneration unit.

It is therefore an object of the present invention to provde an improved hydrocarbon conversion catalyst.

It is another object to provide a method for preparing a silica alumina hydrogel which possesses a desirable unique low surface area/large pore characteristic.

It is a further object to provide a silica-alumina hydrogel which may be advantageously combined with clay and/or crystalline zeolites to yield a cracking catalyst composition which possesses superior catalytic properties.

It is yet another object to provide an amorphous low surface area silica-alumina hydrogel which is characterized by a pore volume distribution wherein the majority of the pore volume resides in large diameter pores of about 50 to 75 A units.

These and still further objects of the present invention will become readily apparent to one skilled in the art from the following detailed description and specific examples.

BRIEF DESCRIPTION OF THE INVENTION

Broadly, our invention contemplates a method for preparing silica alumina hydrogel by the reaction of sodium silicate ($Na_2SiO_2$) with alum$[(Al_2SO_4)_3]$ under conditions wherein about half the sodium silicate is neutralized, i.e., gelled with sulfate, and thereafter aged for up to about 3 hours before further processing into a finished catalyst composition.

DETAILED DESCRIPTION OF THE INVENTION

More specifically, we have made the surprising finding that if about 30 to 90% of the sodium silicate used in the preparation of a silica alumina hydrogel composition is reacted with alum, then aged for about 3 to 180 minutes before addition of additional alumina component, a hydrogel is obtained which possesses a particularly desirable low surface area of about 100 to 500 $m^2/g$ and a pore volume distribution wherein from about 40 to 100% of the total surface area is in pores having a diameter in the range of from about 40 to 125 A units.

It is contemplated that the silica-alumina hydrogel of the present invention may be used as an amorphous cracking catalyst composition. Furthermore, it has been found that the present silica-alumina hydrogel may be combined with varying amounts of clay and/or crystalline alumino silicate zeolite to provide highly active cracking catalyst compositions.

In general, the silica alumina hydrogel of our invention will contain from about 10 to 50% by weight alumina ($Al_2O_3$) and from about 90 to 50% by weight silica as $SiO_2$. When the present silica alumina hydrogel is combined with clay and/or a zeolite additive, it is generally preferred that the overall composition contain from about 10 to 60% by weight clay, and advantageously may contain from about 0.5 to 50% by weight zeolite.

Crystalline alumino silicate zeolites which may be advantageously combined with the silica alumina hydrogel contemplated herein are of the stabilized faujasite type such as are prepared from type X or Y zeolite. These synthetic zeolites possess a silica alumina ratio ranging from about two up to about six and may advantageously contain stabilizing and/or catalytically active metal ions which are exchanged into the zeolitic structure. The thermally stable zeolites may be of the type generally referred to as calcined rare earth exchanged X and Y, i.e., CREX and CREY, or the stabilized faujasites may be of the non-rare earth exchanged type generally recognized as ultrastable faujasite commercially available as type Z–14 US.

To prepare the present silica alumina hydrogels, which contain about 10 to 50% $Al_2O_3$, a solution of alkali metal silicate, preferably sodium silicate is combined with a solution of alum in the procedure outlined below.

1. A sodium silicate solution containing 3 to 7% by weight silica which possesses a formula $Na_2O\ (SiO_2)_{3.2}$, is combined with an alum solution which contains 10 to 90 g/l $Al_2O_3$ and which possesses a formula $Al_2(SO_4)_3 \cdot 18H_2O$. sufficient alum is added to neutralize from about 30 to 90% by weight of the $Na_2O$ in the silicate solution. This amount will be that required to maintain the mixture at a pH of from about 9.5 to 11.0.

2. The mixture, which will possess an initial temperature of from about 50° to 140°F., is permitted to age for a period of from about 2 to 180 minutes.

3. Subsequent to the aging period, addditional alum or alternatively sodium aluminate which possesses a formula $Na_2O \cdot Al_2O_3$ to $1 \cdot 6Na_2O \cdot Al_2O_3$ is added in an amount which will provide the desired finished alumina content for the silica alumina hydrogel being prepared.

4. Subsequent to the addition of the additional alum or sodium aluminate, and preferably subsequent to an additional aging period from 5 to 60 minutes, the solid hydrogel is collected by filtration and washed with water and an ammonium salt, such as ammonium chloride, to remove sodium ion. Subsequent to washing, the soda content of the hydrogel will be on the order of from about 1 to 10%.

5. Subsequent to washing, the hydrogel, which is a fine particulate solid, is reslurried with water and spray dried at a temperature of from about 150° to 400°F. to produce a coherent microspheroidal particle. Preferably these microspheres will possess a particle size range on the order of from about 60 to 200 mesh.

6. Subsequent to spray drying the microspheres are subject to further washing with water and ammonium salt solution to further reduce the soda content of the hydrogel to a level of about 0.1 to 1.0% by weight $Na_2O$.

When it is desired to prepare the above noted silica alumina hydrogel in the form of a clay or zeolite containing composition, the clay is preferably added to the sodium silicate prior to gelation. Where zeolite is added to the composition, the zeolite is preferably added to the gelled silicate prior to slurrying and spray drying. However, it is also contemplated that the clay and/or zeolite component may be added at practically any point during the preparation procedure.

The finished amorphous silica alumina hydrogel will possess a surface area on the order of from about 100 to 500 $m^2/g$. Where clay is added to the finished composition, this net surface area is substantially the same. However, the addition of a zeolite which possesses a high surface area will add a surface area proportionate to the amount of zeolite added. Typical compositions, which contain on the order of 40% clay and about 10% by weight zeolite based on the silica alumina content of the zeolite, will possess a typical surface area range of from about 200 to 400 $m^2/g$ per gram.

The total pore volume of the silica alumina hydrogel by itself will range from about 0.4 to 1.0 cc. per gram. This pore volume is distributed in a manner so that a substantial portion of the pore volume is located in pores having a size range on the order of 25 to 140 A units and preferably about 40 to 125 A units.

The catalytic properties of the present compositions will depend upon the nature and amount of clay and/or zeolite additives, if any are present. By itself, the presently contemplated silica alumina hydrogel, which is essentially amorphous, possesses a typical microactivity on the order of about 50% conversion using a typical or conventional microactivity test conducted at a temperature of about 900°F. using a typical gas oil feedstock. Addition of zeolite and/or clay additives considerably influences microactivity and the addition of as little as 10% by weight zeolite and 40% by clay will yield a microactivity on the order of 90% determined under similar conditions.

The primary advantage of the present catalyst composition resides in the fact that the majority of its pore volume is in pores having a substantial diameter as compared to typical prior art composition. These large pores in the present catalysts reduce the amount of hydrocarbon which is carried over to the regenerator following a catalytic conversion procedure, and accordingly the catalysts are particularly advantageous for use in short residence time risercrackers. It is found that the present catalysts thoroughly regenerate at lower temperatures and therefore exhibit increased stability under commercial cracking conditions. Furthermore, it is found that the present compositions possess superior attrition resistence in that typical attritions on the order of 10 to 30 Davison Index and 1 to 3 Jersey Index are easily obtained. Typically the catalyst will contain from about 8 to 50% by weight alumina, 0.5 to 50% by weight crystalline zeolite, and 10 to 60% by weight clay.

Having described the basic aspects of the present invention, the following examples are given to illustrate specific embodiments thereof.

EXAMPLE 1

A series of preparations were made wherein six samples of silica-alumina hydrogels containing 15, 20, and 30% wt. alumina were obtained. All preparations were conducted at a temperature of 75°F. In samples 1, 2 and 3 the alum addition was interrupted at the 8% $Al_2O_3$ level and the samples were aged for 1 hour before adding the remainder of the alum. In samples 4, 5 and 6 the entire amount of alum required to impart the desired alumina content was added at the beginning of the run and the samples were aged for 1 hour after the alum addition. The pH of all samples was adjusted to neutral with ammonia subsequent to reaction. The physical property measurements were made after calcining the samples at 1000°F. for 3 hours. These preparations are summarized in Table 1 below:

TABLE I

| Sample No. | Wt.%$Al_2O_3$ in Final Composition | Intermediate Aging at 8% $Al_2O_3$ | Surface Area $m^2/g$ | Pore Volume cc/g | Peak in Pore Size Diameter, A | % SA * in pores 45–125 A |
|---|---|---|---|---|---|---|
| 1 | 15 | yes | 340 | .72 | 60 | 14 |
| 2 | 20 | yes | 310 | .71 | 55 | 14 |
| 3 | 30 | yes | 270 | .73 | 60 | 15 |
| 4 | 15 | no | 220 | .16 | 25 | 73 |
| 5 | 20 | no | 100 | .09 | 30 | 66 |
| 6 | 30 | no | 210 | .19 | 25 | 55 |

* In Ex. 1–3: 85% of the surface area was in pores less than 45 A diameter.
In Ex. 4–6: the majority of the remaining SA was in pores greater than 125 A Inspection of the data in Table 1 reveals that the novel intermediate aging step of the present invention (Samples 1, 2 and 3) produces a silica-alumina hydrogel which has the majority of its pore volume in pores having a diameter almost twice that of comparison Samples 4, 5, and 6.

EXAMPLE 11

A catalyst sample containing 11% by weight (Si/Al basis) calcined rare earth exchanged type Y zeolite (CREY) was prepared as follows:

A sodium silicate-clay slurry containing 5.5% by wt. $SiO_2$ and 364 g of kaolin clay per gallon was combined at a rate of 1 gallon per minute with 755 ml per minute of an alum solution which contained 27.5 g $Al_2O_3$ per liter. The run was conducted for 15 minutes to obtain a thick gel having a pH of 10.7. To the gel 5480 g of sodium aluminate solution containing 20% by wt. $Al_2O_3$ was added to yield a mixture having a pH of 12.7. One gallon of water was added and the mixture was aged for 1 hour at 120°F. An additional 10.425 l of alum was added which contained 77.2 g $Al_2O_3$/l to obtain a mixture having a pH of 5.2. Then 1.05 l of 14% by wt. $NH_3$ solution was added to obtain a pH of 7.9. 1960 g of CREY was added with mixing and the product was recovered by filtration. This product was reslurried with water and spray dried. The spray dried product was washed successively with 40% ammonium sulfate solution; 5% ammonium carbonate solution; and finally water.

The catalyst possessed the following analysis which is compared to that of a standard commercial CREY containing catalyst (DZ-7):

TABLE II

|  | Example II | DZ-7 |
|---|---|---|
| $Al_2O_3$ (wt. %) | 38.0 | 39.7 |
| $Na_2O$ (wt. %) | 0.10 | 0.08 |
| $RE_2O_3$ (wt. %) | 2.4 | 2.5 |
| Surface area (m²/g) | 234 | 282 |
| Pore Volume (cc/g) | 0.34 | 0.47 |
| Davison Index | 30 | 35 |
| Jersey Index | 2.8 | 3.5 |

EXAMPLE 111

The catalyst of Example 11 was evaluated from the standpoint of cracking catalyst activity. A sample of commercially available zeolite containing cracking catalyst (DZ-7) was also evaluated fro the purpose of comparison. It is seen from the data submitted below that Example 11 catalyst (of the present invention) possessed superior activity than the standard commercial catalyst. The samples were treated with steam at 1520°F. for 8 hours before evaluation at 920°F using a 4:1 catalyst to oil ratio at 40 weight hourly space velocity.

TABLE III

| Sample | Example II | DZ-7 |
|---|---|---|
| Conversion Volume (V)% of fresh feed (FF) | 77.0 | 74.5 |
| Total $C_3$'s V% FF | 10.1 | 10.0 |
| Total $C_4$'s V% FF | 12.3 | 7.5 |
| $C_5^+$ gaso.; V% FF | 66.0 | 67.5 |
| Coke; wt% FF | 3.3 | 3.2 |

The above examples clearly illustrate that a superior cracking catalyst composition may be obtained by following the teachings set forth herein.

We claim:

1. A process for converting hydrocarbons which comprises contacting the same under catalytic cracking conditions with a hydrogel catalyst having a pore size distribution wherein the majority of the pores have a diameter of about 45 to 125 A units prepared by:
   a. combining an aqueous solution of sodium silicate with aluminum sulfate, said aluminum sulfate being combined in amounts sufficient to react with about 30 to 90% of said sodium silicate;
   b. aging the mixture obtained by way of step (a) at a pH of about 9.5 to 11.0 and at a temperature of 50°–140°F. for a period of about 2 to 180 minutes;
   c. adding sodium aluminate or aluminum sulfate to said aged reaction mixture obtained by way of step (b) to impart the desired alumina content to the hydrogel and aging for about 5 to 60 minutes,
   d. recovering and washing said hydrogel, and,
   e. reslurrying the washed hydrogel with water and spray drying at a temperature of about 150° to 400°F. to form particles suitable for introduction into a fluid catalytic conversion zone.

2. The process of claim 1 wherein from about 10 to 50% by weight of the alumina in said hydrogel is provided by said sodium aluminate.

3. The process according to claim 1 wherein the catalyst contains 10–60 weight percent clay and 0.5 to 50 weight percent of a zeolitic aluminosilicate.

4. The process according to claim 3 wherein the zeolite is added to mixture subsequent to addition of the aluminum sulfate solution in step (a).

5. The process according to claim 3 wherein the clay is added to the sodium silicate solution prior to addition of the aluminum sulfate solution in step (a).

* * * * *

UNITED STATES PATENT AND TRADEMARK OFFICE
CERTIFICATE OF CORRECTION

PATENT NO. : 3,912,619
DATED : October 14, 1975
INVENTOR(S) : John Storey Magee, Jr. et al.

It is certified that error appears in the above-identified patent and that said Letters Patent are hereby corrected as shown below:

In columns 3 and 4, Table I and the footnotes thereto should read as indicated:

| Sample No. | Wt.% $Al_2O_3$ in Final Composition | Intermediate Aging at 8% $Al_2O_3$ | Surface Area $m^2/g$ | Pore Volume cc/g | Peak in Pore Size Diameter, A | % SA * in pores 45-125A |
|---|---|---|---|---|---|---|
| 1 | 15 | yes | 340 | .72 | 60 | 73 |
| 2 | 20 | yes | 310 | .71 | 55 | 66 |
| 3 | 30 | yes | 270 | .73 | 60 | 55 |
| 4 | 15 | no | 220 | .16 | 25 | 14 |
| 5 | 20 | no | 100 | .09 | 30 | 14 |
| 6 | 30 | no | 210 | .19 | 25 | 15 |

\* In Ex. 1-3: the majority of the remaining SA was in pores greater than 125A.
In Ex. 4-6: 85% of the surface area was in pores less than 45A diameter.

Signed and Sealed this twenty-fourth Day of February 1976

[SEAL]

Attest:

RUTH C. MASON
Attesting Officer

C. MARSHALL DANN
Commissioner of Patents and Trademarks